United States Patent
Schumann et al.

(10) Patent No.: US 10,502,823 B2
(45) Date of Patent: Dec. 10, 2019

(54) METHOD AND DEVICE FOR DETECTING OBJECTS

(75) Inventors: Michael Schumann, Stuttgart (DE); Volker Niemz, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1005 days.

(21) Appl. No.: 13/880,926

(22) PCT Filed: Sep. 12, 2011

(86) PCT No.: PCT/EP2011/065748
§ 371 (c)(1),
(2), (4) Date: Dec. 16, 2013

(87) PCT Pub. No.: WO2012/052229
PCT Pub. Date: Apr. 26, 2012

(65) Prior Publication Data
US 2013/0214918 A1    Aug. 22, 2013

(30) Foreign Application Priority Data
Oct. 20, 2010   (DE) .................. 10 2010 042 653

(51) Int. Cl.
*G01S 13/02* (2006.01)
*G01S 13/48* (2006.01)
(Continued)

(52) U.S. Cl.
CPC .............. *G01S 13/02* (2013.01); *G01S 13/48* (2013.01); *G01S 13/582* (2013.01);
(Continued)

(58) Field of Classification Search
CPC .......... G08G 1/16; B60Q 1/525; B60Q 9/008; G01S 13/02; G01S 13/48; G01S 13/582;
(Continued)

(56) References Cited

U.S. PATENT DOCUMENTS 5,473,332 A  *  12/1995  James .................. G01S 7/023
                                                       342/101
6,264,337 B1 *  7/2001  Rannells, Jr. .......... B60R 1/025
                                                       180/167
(Continued)

FOREIGN PATENT DOCUMENTS

CN         101329397       12/2008
DE     10 2004 004 492      8/2005
(Continued)

OTHER PUBLICATIONS

International Search Report, International Application No. PCT/EP2011/065748, dated Dec. 13, 2011.

*Primary Examiner* — Hai Phan
*Assistant Examiner* — Anthony D Afrifa-Kyei
(74) *Attorney, Agent, or Firm* — Norton Rose Fulbright US LLP; Gerard Messina

(57) ABSTRACT

A method and device for vehicle-supported object detection. A pulse is emitted into the surroundings using a transducer situated in a vehicle, and the pulse, which is reflected back by an object in the surroundings, is recorded using the transducer. The transducer and the object move relative to each other. The emission and/or the recording are carried out according to a directional characteristic of the transducer, which has at least two directional lobes. Signal components of the reflected pulse, which have different frequency shifts, are separated from one another on the basis of the frequency shift or are assigned to respectively one of the directional lobes. An object detection is carried out in each case for the different signal components and the assigned directional lobes.

11 Claims, 1 Drawing Sheet

(51) Int. Cl.
*G01S 13/58* (2006.01)
*G01S 13/93* (2006.01)

(52) U.S. Cl.
CPC .......... *G01S 13/931* (2013.01); *G01S 15/931* (2013.01); *G01S 2013/9314* (2013.01); *G01S 2013/9321* (2013.01); *G01S 2013/9332* (2013.01); *G01S 2013/9342* (2013.01); *G01S 2013/9385* (2013.01); *G01S 2015/938* (2013.01)

(58) Field of Classification Search
CPC ................ G01S 13/931; G01S 15/931; G01S 2013/9314; G01S 2013/9321; G01S 2013/9332; G01S 2013/9342; G01S 2013/9385; G01S 2015/938
USPC ....... 340/435; 180/232, 271, 274; 293/4, 10; 200/61.44
See application file for complete search history.

(56) References Cited

U.S. PATENT DOCUMENTS

| | | | |
|---|---|---|---|
| 6,518,916 | B1 | 2/2003 | Ashihara et al. |
| 7,663,533 | B2 | 2/2010 | Toennesen et al. |
| 2007/0222662 | A1* | 9/2007 | Toennesen ............... G01S 13/48 342/27 |
| 2009/0040037 | A1* | 2/2009 | Schraga ................ G01S 7/4017 340/459 |
| 2011/0181456 | A1 | 7/2011 | Luebbert et al. |
| 2011/0267924 | A1* | 11/2011 | Horsky ................. G01S 15/325 367/99 |

FOREIGN PATENT DOCUMENTS

| | | |
|---|---|---|
| DE | 600 24 949 | 6/2006 |
| DE | 10 2006 032 540 | 1/2008 |
| JP | 6 174821 | 6/1994 |
| WO | WO 2007/147355 | 12/2007 |
| WO | WO 2007147533 | 12/2007 |

* cited by examiner

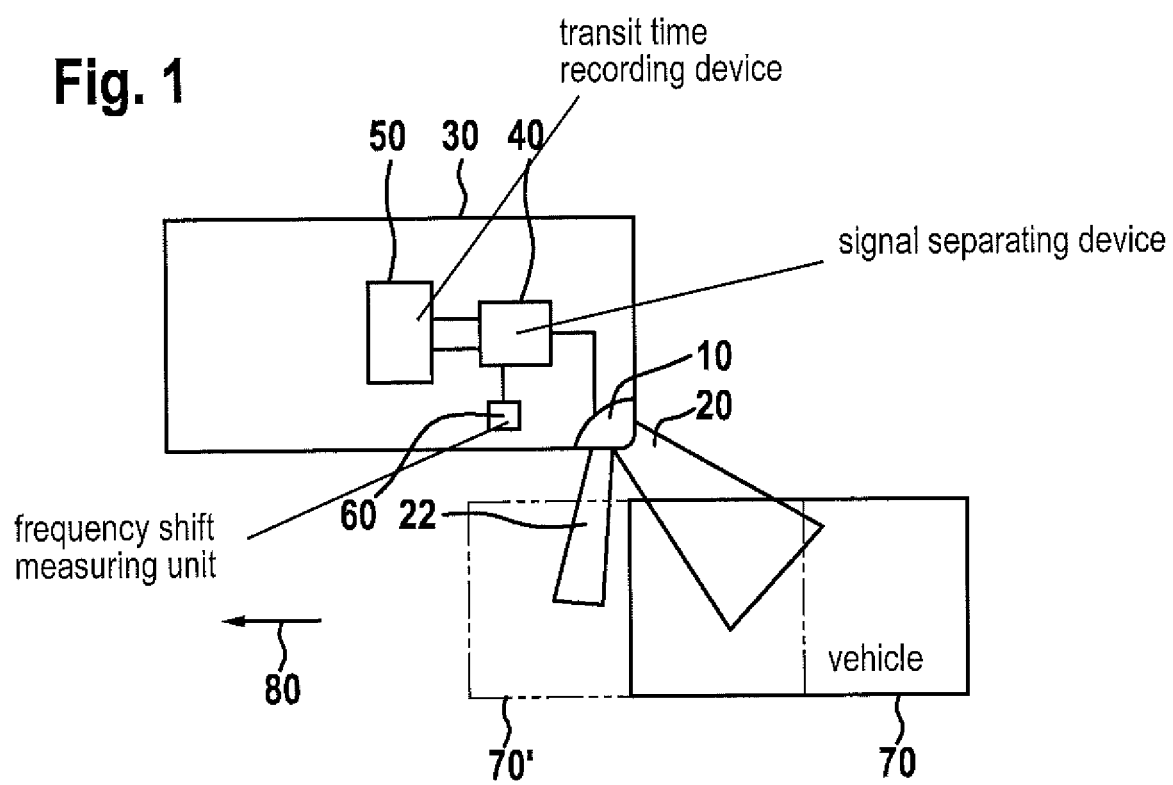
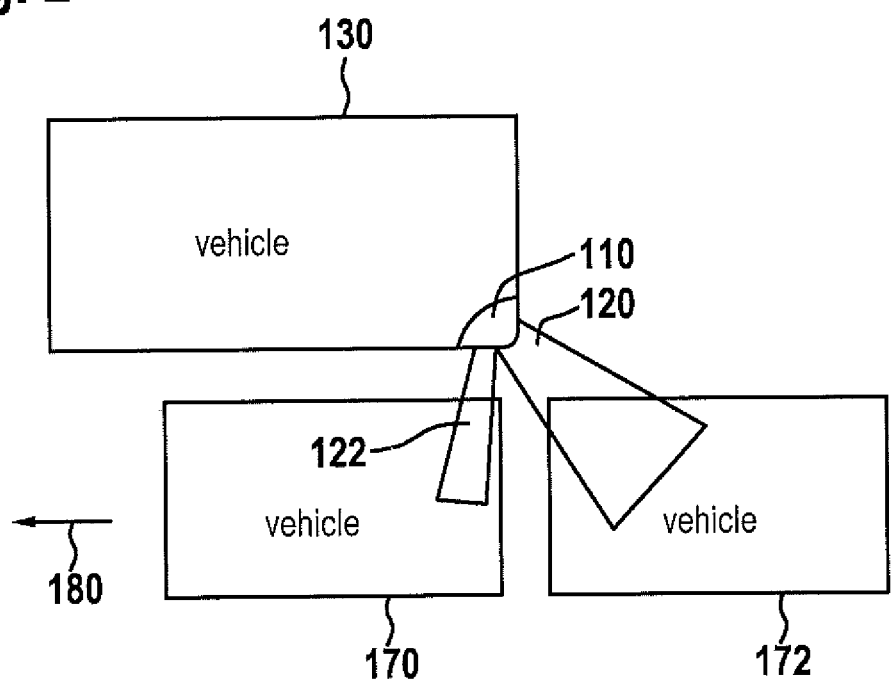

METHOD AND DEVICE FOR DETECTING OBJECTS

BACKGROUND INFORMATION

In connection with pulse echo-based detection, conventional methods which scan the surroundings of vehicles particularly use acoustical sound waves. One may use the shift in frequency produced by the Doppler effect to detect the speed of objects, specifically the relative speed between a transducer and a reflecting object.

These methods are used particularly for parking systems or generally for driver assistance systems, in each case a transducer covering a sector specific to the transducer. The problem basically exists that a wide sector does cover a wide range of dangers, to be sure, but is not particularly directionally selective, while a narrow sector is directionally selective but covers only a small range of dangers. A plurality of consecutive transducers having small sectors are cost-intensive, however, and are linked to complex mounting.

PCT Application No. WO 07/147,533, a method is described in which modulated transmission pulses, that are emitted using a directional lobe, are used to detect various objects having different Doppler-shifted frequencies. However, the modeling is costly, requires precise and synchronized receiving mechanisms and limits the working distance (because of a minimum modulation frequency that has to be maintained).

Conventional methods for object detection are consequently not directionally selective or they require a large expenditure. It is therefore one object of the present invention to provide a method and a device by which, using simple means, a scanning of the surroundings is provided which permits a high directional resolution or spatial resolution.

SUMMARY

Using simple means, the present invention makes possible a spatially resolved distinction of objects and specific scanning for narrow angular ranges. The precision with respect to conventional systems is increased particularly in that various frequency shifts of a broad detection sector are not mutually overlapped and thus interfere with the receiving signal, but are observed separately. Compared to conventional systems, the present invention enables a clearly more specific separation of objects, without costly transducer systems or circuits being required. Above all, in the example embodiment of the present invention, the transducers are able to be integrated particularly inauspiciously into a vehicle exterior, where effects on the nearfield, conditioned upon mounting, do not lead to a worse performance of the system, but rather, make possible the directional separation in a simple manner. In particular, blind-spot detection becomes possible, which could not be done using customary systems, without resorting to a plurality of transducers having narrow sensor fields. The high directional selectivity according to the present invention leads, above all, to a clearly shortened reaction time when the vehicle is moving towards obstacles. At the same time, false alarms due to supposed obstacles are avoided, using the high directional selectivity due to the present invention. Furthermore, objects are able to be detected clearly better in their extension and motion, as compared to conventional systems.

The present invention is based on the separation of different transmission directions (i.e., directional lobes) with the aid of Doppler shifts. Since the Doppler shift depends only on a radial component of motion between the reflected object and the transducer (such as the antenna), and not on the tangential components of motion, variously strong Doppler shifts form at different directional lobes (i.e., at different main directions or main angles), particularly since the relationship of tangential to radial components of motion is a function of the orientation of object and transducer.

Thus, when the transducer is situated on a vehicle, a plurality of directional lobes of one and the same transducer may lead to a plurality of signal components which the transducer receives, and which have differently great frequency shifts based on the Doppler effect. The plurality of directional lobes of the same transducer are distinguished on the basis of signal components which differ in their frequency shift. Because of this distinction, a greater angular resolution comes about according to the different directional lobes. Therefore, one and the same transducer not only provides a pulse echo information (in the form of a transit time or a distance or another object-specific property) but one pulse echo information for each directional lobe. The pulse echo information is ascertained and evaluated within the scope of an object detection (for example, with regard to a transit time or a distance).

The present invention relates to a method for vehicle-supported object detection. Object detection may particularly be provided by detecting the presence of an object or by recording the distance between by a transducer and an object or by recording other object features. A pulse is emitted into the surroundings using a transducer. The transducer is situated on a vehicle, particularly on a motor vehicle such as a passenger car or a truck, and is directed outwards starting from the vehicle. Using the transducer, a pulse is recorded that is reflected back from an object in the surroundings. The recorded pulse corresponds to the pulse that is emitted and reflected back by the object. The transducer (or rather the vehicle) and the object move with respect to each other. The vehicle equipped with the transducer is able to move, for instance, within the scope of a parking process, on a foundation, while other vehicles standing on the foundation (or other objects relevant to the traffic) do not move, so that the motion of the parking vehicle corresponds to the relative motion of the transducer.

The emission and/or the recording are carried out according to a directional characteristic of the transducer, which has at least two directional lobes. The pulse may be recorded by the same transducer that has the directional lobes and which also emits the pulse. Alternatively, the pulse may be emitted by a transducer while another transducer receives the pulse that is reflected back. In this instance, the emitting transducer may have a directional characteristic having a plurality of directional lobes or not, while the receiving transducer preferably has a directional characteristic having a plurality of directional lobes. It is therefore sufficient if the receiving transducer has a directional characteristic having a plurality of directional lobes.

Furthermore, signal components of the reflected pulses, which have different frequency shifts, are separated with the aid of the frequency shift. The plurality of directional lobes of the same transducer are separated or distinguished from one another with the aid of the different frequency shifts of the signal components. For the different signal components, in each case, an object detection is carried out, a distinction being made between the directional lobes.

In addition, the signal components of the pulses reflected back, which have different frequency shifts, may be associated, with the aid of the different frequency shift, respectively with one of the directional lobes.

One object detection is carried out respectively for each of the directional lobes, whereby the different directional lobes are used separately for the object detection. The distinguishing feature of the signal components is the frequency shift with respect to the emitted pulse. With the aid of this feature, the signal components are divided up into the directional lobes. According to one aspect, the method may be regarded as a frequency multiplex method, the frequency separation being achieved by different Doppler shifts. According to an additional aspect, the method may be regarded as a directional multiplex method (or a spatial multiplex method), the different directions of the directional lobes subdividing the space, and it being possible to access different directions by selecting certain signal components which are to be distinguished with the aid of the frequency shift.

According to one specific embodiment, object components, which are recorded by different directional lobes (i.e., different signal components), are assigned to a common object if comparable distances are recorded for the object components.

Furthermore, object components, which are recorded by different directional lobes (i.e., different signal components), are assigned to different objects or signal components in the different directional lobes, if different distances are detected for the object components.

Finally, an object component, which is recorded only in one or in a subgroup of the directional lobes, is assigned to an object which is located only in this group or in the subgroup of the directional lobes.

Because of this, the resolution, according to the example embodiment of the present invention, of the directional characteristic and the Doppler shift linked to it is used for the greater spatial resolution of the objects in the surroundings. A plurality of objects may be distinguished and the size of the objects may be resolved more highly.

According to one specific embodiment of the present invention, the motion of an object is subdivided based on the different alignments of the directional lobes into radial components of motion, which lead to the different frequency shifts of the pulses. For each directional lobe, one location information (which includes a distance information and an angle information or a coordinate point) is produced with the aid of a pulse transit time of that signal component which is assigned to the respective directional lobe, or for each signal component a location information is produced (which includes a distance information) with the aid of the pulse transit time of this signal component. For a plurality or for each directional lobe, or for a plurality or for each signal component, a radial speed information is generated with the aid of the frequency shift of the respective signal component, or with the aid of the frequency shift of that signal component which is assigned to the respective directional lobe.

An association between a directional lobe and a signal component may include an ascertainment of an angle-referenced orientation of an object with respect to the vehicle, such as by optical recording or by a pulse echo-based scanning, especially using ultrasound.

The locational information may be generated by combining a distance that is yielded by the pulse transit time, with the alignment of the associated directional lobe. The locational information reflects the coordinates of a polar coordinate system or a Cartesian coordinate system.

The pulse may be provided as an ultrasonic pulse or as an electromagnetic pulse, particularly as an electromagnetic microwave pulse. The emitting transducer or the receiving transducer may therefore be an acoustical transducer, particularly a piezo element, or an antenna may be, for instance, a patch antenna.

The pulse emitted may be provided with a predefined frequency curve, preferably having a constant frequency or having a frequency curve that comes about by excitation with a constant frequency. The recorded pulse is compared to the emitted pulse, particularly in order to record the frequency shift.

The example method may be used particularly for recording the surroundings of a vehicle. The pulse is emitted from the vehicle and received, the at least one transducer being positioned on an outer side of the vehicle and aligned towards the surroundings.

One respective specific embodiment of the present invention provides that the vehicle move on a foundation with respect to the object, the object being situated in a fixed location on the foundation. The example method may particularly be used for parking assistance systems, the object being a parked vehicle. The method may be provided as a parking assistance method, which represents an admissible driving range (visually or acoustically). The admissible driving range is based on the object detection.

The pulse is emitted and/or recorded as an acoustical pulse, having a directional characteristic in which at least directional lobes are developed by sonic guidance elements, such as a funnel or a funnel-shaped mounting, in which the transducer is situated in a recessed manner. The directional lobes may further be generated by an arrangement of antenna elements, the directional lobes coming about from the Fourier-transform of the radiation curve along the antenna elements.

The present invention is further provided by a device for the vehicle-supported object detection. This includes a transducer having a directional characteristic which has at least two directional lobes. The transducer is designed to be fastened on a vehicle. The device further includes a frequency-selective signal separating device connected to the transducer, which is equipped to receive signals of the transducer and to separate them into signal components of different frequencies. Finally, the device includes a transit time recording device which is connected to the signal separating device. The transit time recording device is equipped to record a transit time for at least one of the signal components, preferably for at least two of the signal components which were separated by the signal separating device with regard to their frequency. The frequency-selective signal separating device is a filter which separates at least two frequencies from each other, i.e., a low pass or a high pass. The frequency-selective signal separating device may further be equipped to generate the frequency spectrum from the signal received, and to distinguish subspectra which are frequency-shifted to a different degree (including a shift of zero). The signal separating device may be equipped to detect relative maxima in the frequency spectrum and, with the aid of the maxima, to distinguish the signal components of a different frequency shift.

The device according to the present invention may further include an object-detecting device which is connected to the signal-separating device or an output of this device. The object-detecting device is equipped to assign signal components having comparable transit times and different frequencies to a common object, which is located in the angles of extension of the associated directional lobes (and should thus be assigned to the corresponding signal component). The object-detecting device may alternatively, or in combination to this, be equipped to assign signal components having different transit times and different frequencies to different objects. These objects are each located in at least one angle of extension of the directional lobes, and consequently they reflect back a pulse which corresponds to the corresponding signal component (i.e., frequency shift). Alternatively or in combination to this, the object-detecting device may be equipped to assign signal components, whose frequency or frequencies are only able to be assigned to a directional lobe or a subgroup of the directional lobes, to an object that is located only in this directional lobe or in the subgroup of the directional lobes, and is at a distance from the transducer according to the associated transit time or transit times.

The object-detecting device therefore corresponds to an evaluation device for pulse echo signals, the latter being processed for signal components of the same pulse separated from one another with regard to the signal transit times. This device may therefore be regarded as a multi-channel device, which is in a position of processing a plurality of signal components simultaneously, and to combine the results to form a more complex locality information or object information (for a plurality of objects). Furthermore, a display may be provided which represents the object information to the driver, or a memory device may be provided in which the object information is stored, an acoustical or optical warning device being actuated by a collision detector if, in the memory connected to the collision detector, object data are present which represent an object near the vehicle, particularly in its travel direction.

In one especially preferred specific embodiment, the transducer has a directional characteristic having a directional lobe which, if the transducer is fastened to the vehicle via a mounting of the transducer, points perpendicular to the longitudinal axis of the vehicle or in the direction of the longitudinal axis. In other words, the transducer and the mounting are conditioned so that a directional lobe of the transducer is aligned perpendicularly or in parallel to the vehicle. Because of this, objects having a relative motion between object and vehicle, directed in parallel past the vehicle or perpendicularly at the vehicle, either have a maximal frequency shift or a frequency shift of zero. Since an additional directional lobe of the transducer generates a signal component having a frequency shift less than the maximum frequency shift or a frequency shift not equal to zero, the signal components are able to be separated from one another more simply.

In the same way, the transducer including its mounting, for reasons of simplified calculation, may have a directional lobe that is at an angle of 45° to the longitudinal axis of the vehicle.

The present invention relates particularly to a passive, partially automatic (i.e., only steering) or automatic (i.e., steering and driving speed controlling) parking assistance system having the device, according to the present invention, for vehicle-supported object detection.

In particular, the present invention may be implemented using a device according to the present invention, having a plurality of transducers and associated detection components, the object data of the transducers being assembled in a combination apparatus which unifies the object data to form a common representation. Furthermore, the objects are provided with relative speed information which is ascertained with the aid of the absolute amount and the sign of the frequency shift.

BRIEF DESCRIPTION OF THE DRAWINGS

FIG. 1 shows a vehicle equipped with an example device according to the present invention, in a situation that explains the example method according to the present invention.

FIG. 2 shows an additional situation explaining the example method according to the present invention.

DETAILED DESCRIPTION OF EXAMPLE EMBODIMENTS

A vehicle 30 is shown in FIG. 1, which is equipped with a transducer 10, transducer 10 having a directional characteristic which has two directional lobes. In FIG. 1 the directional lobes are shown symbolically, FIG. 1 showing both the angle covered and the working distance. The working distance ends with the closing line which connects the two legs shown to each other.

Transducer 10, as a part of the device, is connected to a signal separating device 40, and supplies the converted electrical signals to signal separating device 40. These are subdivided in signal separating device 40, as a function of frequency, into different greatly shifted signal components which are passed on to a transit time recording device 50. In addition, the device according to the present invention includes a frequency shift measuring unit 60. The latter is devised to ascertain the frequency shifts of the individual components (as compared to the emission frequency). Frequency shift measuring unit 60 is therefore connected to signal separating device 40. In a variant not shown, frequency shift measuring unit may particularly be connected to the outputs of the signal separating device at which the signal components are present. The device includes all the detection components 10, 40, 50 and 60. The device itself does not include vehicle 30, but rather, the device is situated only to be fastened on vehicle 30.

In the situation shown in FIG. 1, an additional vehicle 70 is passing vehicle 30, according to direction of motion 80. When additional vehicle 70 (which represents one of a multitude of possible traffic objects) is located in a position shown by the solid line, and is moving past vehicle 30, because of the inclination of directional lobe 20 to the vertical of direction of motion 80, there comes about a frequency shift towards higher frequencies caused by the Doppler effect. Directional lobe 22 would have a different frequency shift (generally none), but vehicle 70 is not located in directional lobe 22. Therefore, only one signal component is produced, namely that of directional lobe 20, whereas no signal component is generated which originates from directional lobe 22. For this reason, a frequency shift towards higher frequencies is ascertained, and one may conclude that an object is located in directional lobe 20, but not in directional lobe 22. Thus, a higher resolution is brought about. In addition, with the aid of the Doppler effect, one may draw a conclusion on the relative speed of vehicle 70. From the object data one may conclude that vehicle 70 is staying offset to vehicle 30, but is not next to vehicle 30. From the frequency shift it may be concluded that the vehicle is closing the gap and moving into a region next to vehicle 30.

A subsequent situation is shown by the dot-dashed line. Vehicle 70' is located in both directional lobes 20, 22, so that two signal components are yielded. A first signal component has generally no, or only a slight Doppler shift towards lower frequencies, the first signal component originating from directional lobe 20. A second signal component has a comparatively strong Doppler shift towards higher frequencies, the second signal component originating from directional lobe 22. The frequency shifts differ in strength and sign. The first and the second signal component both show the same propagation delay, so that one may conclude that the distance is the same and consequently the object is the same that is being detected by the signal components. One may further conclude directly that there is an object located in both directional lobes 20, 22. Therefore, the present invention also permits a size resolution using both directional lobes.

FIG. 2 shows an additional situation for clarifying the present invention. A vehicle 130 equipped according to the present invention is equipped with a transducer that has two directional lobes. At first, a first additional vehicle travels into the sensor region of transducer 110, followed by a second, additional vehicle 172. During the traveling in, there comes about a first signal component because of the entering of the first vehicle through directional lobe 120. Upon further traveling in, a second signal component comes about because of vehicle 170, which is entering into directional lobe 122. In response to the motion of the vehicles further in direction 180, the first vehicle exits from directional lobe 120 and vehicle 172 enters into directional lobe 122. When there is sufficient distance between the vehicles (greater than the width of a directional lobe) the clearance space is detected and the two vehicles are recorded as a single object, and in particular, vehicle 172 is recorded as an individual object and generates a signal component via directional lobe 120, while vehicle 170 generates a signal component via directional lobe 122. In the situation shown in FIG. 2, vehicle 170 has already traveled out of directional lobe 120, so that the recordings described above are made possible and the corresponding signal components are yielded. In response to further motion in direction 180, vehicle 170 exits from directional lobe 122 and the gap between the two vehicles 170, 172 is recorded by directional lobe 122, in that the signal component generated by this directional lobe being omitted. In all the situations described with the aid of FIG. 2, there is yielded only one slight frequency shift towards smaller frequencies which represents the signal component of directional lobe 122, while directional lobe 120 generates a bigger frequency shift towards larger frequencies. By this, the directional lobes are able to be distinguished and are able to detect the objects at finer angle resolution. Without the frequency shift-dependent distinction, the two vehicles would be detected only as a single object.

If (by contrast to the representation in FIG. 2), the two vehicles 170, 172 were at different distances from vehicle 130, then by grouping similar recorded transit times, vehicles 170, 172 could further be distinguished with the aid of this information with regard to their location (relative to vehicle 130), one vehicle perhaps having one associated directional lobe assigned to it and another vehicle, that lies closer or farther away, having the other directional lobe assigned to it. Moreover, it may be seen directly that a first vehicle within the operating range of the transducer does not block the entire transducer, but another vehicle may be individually detected with the aid of a gap between the vehicles, with the aid of different speeds and particularly with the aid of the individual evaluation of the signal components.

An additional transducer may be provided at the front lower corner, which scans the lateral surroundings of the vehicle, preferably according to the example method according to the present invention.

In general, the example method and the example device may be used particularly for tracking systems and parking systems.

What is claimed is:

1. A method for vehicle-supported object detection, comprising:
    emitting a pulse into a surroundings using a transducer situated on a vehicle; and
    recording, using the transducer, a pulse that is reflected back by an object in the surroundings, the transducer and the object moving relative to each other, at least one of the emitting and the detecting being carried out according to a directional characteristic of the transducer, which has at least two directional lobes;
    separating signal components of the reflected pulse, which have different frequency shifts, from one another based on the frequency shifts;
    assigning the signal components of the reflected pulse, respectively, to one of the directional lobes; and
    detecting an object based on the different signal components and the assigned directional lobes.

2. The method as recited in claim 1, wherein object components which are detected by different directional lobes are one of: i) assigned to a common object if comparable distances are detected for the object components, and ii) are assigned to different objects in the different directional lobes if different distances are detected for the object components, and an object component that is detected only in one directional lobe or in a subgroup of the directional lobes is assigned to an object which is located only in the directional lobe or in the subgroup of the directional lobes.

3. The method as recited in claim 1, wherein a motion of an object is subdivided into radial components of motion based on the different alignments of the directional lobes, which lead to the different frequency shifts of the pulses, a location information being generated for each directional lobe with the aid of a pulse transit time of that signal component which is assigned to the respective directional lobe, and for each directional lobe a radial speed information being generated based on the frequency shift of that signal component which is assigned to the respective directional lobe.

4. The method as recited in claim 3, wherein the generating of the location information includes: combining a distance, that is yielded by the pulse transit time, with an alignment of the associated directional lobe, and providing location information as coordinates of one of a polar coordinate system or a Cartesian coordinate system.

5. The method as recited in claim 1, wherein the pulse is emitted as one of an ultrasonic pulse or an electromagnetic microwave pulse, which has a predefined frequency curve to which the recorded pulse is compared.

6. The method as recited in claim 1, wherein the pulse is emitted from and received by a vehicle, and the at least one transducer is positioned on an outside of the vehicle and aligned towards the surroundings.

7. The method as recited in claim 6, wherein the method is performed while the vehicle moving relative to the object and on a foundation, the object being situated fixed on the foundation, and being a parked vehicle, and further comprising providing a parking assistance which represents an admissible travel range, the representation of an admissible travel range being based on the object detection.

8. A device for vehicle-supported object detection, comprising:
- a transducer having a directional characteristic which has at least two directional lobes and which is equipped to be fastened on a vehicle;
- a frequency-selective signal separating device which is equipped to receive signals of the transducer, to separate the received signal into signal components of different frequencies based on different frequency shifts of the signal components, and to assign the signal components, respectively, to one of the directional lobes;
- a transit time recording device which is connected to the signal separating device and is equipped to record a transit time for at least one of the signal components; and
- an object detection device which detects an object based on the different signal components and the assigned directional lobes.

9. The device as recited in claim 8, wherein the object detection device is connected to the signal separating device and equipped to assign signal components having comparable transit times and different frequencies to a common object that is located in angles of extension of the associated directional lobes, to assign signal components having different transit times and different frequencies to different objects, which are each located in at least one angle of extension of the directional lobes, and to assign signal components whose frequencies are only able to be assigned to one directional lobe or to a subgroup of the directional lobes, to an object that is only located in the one directional lobe or in the subgroup of directional lobes, and is at a distance from the transducer according to the associated transit time.

10. The device as recited in claim 8, wherein the transducer is one of a piezoelectric or electromagnetic ultrasonic transducer which is fastened in a mounting which extends partially in a radiation space half of the transducer and which, based on its geometry, is equipped to provide the directional characteristic having at least a relative minimum which separates at least two directional lobes.

11. The device as recited in claim 8, wherein the transducer is one of an antenna or an antenna system, which based on phase elements provides a directional characteristic having at least one relative minimum.

* * * * *